United States Patent
Harouche (10) Patent No.: US 7,293,025 B1
(45) Date of Patent: Nov. 6, 2007

(54) HOSTED LEARNING MANAGEMENT SYSTEM AND METHOD FOR TRAINING EMPLOYEES AND TRACKING RESULTS OF SAME

(76) Inventor: David Harouche, 45-28 Jayson Ave., Great Neck, NY (US) 11020

( * ) Notice: Subject to any disclaimer, the term of this patent is extended or adjusted under 35 U.S.C. 154(b) by 418 days.

(21) Appl. No.: 10/812,674

(22) Filed: Mar. 31, 2004

(51) Int. Cl.
*G06F 17/30* (2006.01)

(52) U.S. Cl. ............... 707/10; 707/8; 707/9; 709/217; 709/218; 709/219

(58) Field of Classification Search .............. 707/1–10, 707/100–104.1; 709/217–219
See application file for complete search history.

(56) References Cited

U.S. PATENT DOCUMENTS

| | | | |
|---|---|---|---|
| 6,514,079 B1 | 2/2003 | McMenimen et al. | |
| 2002/0106622 A1* | 8/2002 | Osborne et al. | 434/350 |
| 2004/0267607 A1* | 12/2004 | Maddux | 705/11 |

OTHER PUBLICATIONS

Learn it Campus Interactive Scenario—Based Training, www.learnitcampus.com, date: unknown.

Giorgio Armani Streamlines Employee Training and Boosts Efficiency with Outsourced Interactive Learning Tool, Stores, Date: Nov. 2002.

* cited by examiner

*Primary Examiner*—Isaac Woo
(74) *Attorney, Agent, or Firm*—Pryor Cashman LLP; Barry E. Negrin Esq.

(57) ABSTRACT

A system and method of training employees via a hosted learning management training system is provided. A test is shown on or near at least one local computer in a store or office. An employee is able to enter answers to the test questions on the local computer. A remote computer server is provided in communication with the local computer. Only the employee identifier and test information are transmitted from the local computer to the server when an employee interacts with the training program. Answers tallied on the server are preferably transmitted back to the local computer for access by the employee or supervisor. The local computer is preferably owned by a first company and the remote server is preferably owned by an information company servicing the first company. The first company pays the information company a subscription fee for participating in the training program.

22 Claims, 6 Drawing Sheets

FIG. 1

Home
PROTEGÉ, INC.
Results as of Feb 11, 2004 - 11:51:14 AM
Click a Program Name for Additional Information and Sorting Options

| | Students Enrolled | Students Started | Students Completed | Average Score |
|---|---|---|---|---|
| All Programs Companywide | | | | |
| Adptng to Change Seminar | 877 | 33 | 32 | 74.5 |
| Advanced Selling Video | 877 | 67 | 66 | 92 |
| Alterations Video | 877 | 71 | 70 | 75.03 |
| Client Services Video | 877 | 76 | 73 | 64.52 |
| Communication Seminar | 877 | 43 | 41 | 70.73 |
| Diversity Seminar | 877 | 19 | 15 | 45.33 |
| Grooming/Etiquette Video | 877 | 82 | 81 | 91.22 |
| Harassment Seminar | 877 | 40 | 35 | 69.71 |
| Orientation | 877 | 69 | 68 | 92.68 |
| Performance Counseling | 358 | 89 | 70 | 85.6 |
| Performance Counseling TR | 358 | 20 | 20 | 91 |
| Position Specific Checklist | 877 | 60 | 60 | 91.1 |
| Product Knowledge | 877 | 26 | 24 | 77.5 |
| Recruitment and Selection | 322 | 75 | 67 | 87.71 |
| Recruitment and Selection TR | 322 | 12 | 11 | 90.91 |
| Sit Leadership Seminar | 877 | 40 | 33 | 54.79 |
| Teamwork Seminar | 877 | 60 | 58 | 66.28 |
| Welcome Video | 877 | 79 | 78 | 91.03 |

Fig. 2

Programs
70 — PROTEGÉ, INC.

FIG. 3

72 — Results as of Feb 11, 2004 - 12:06:26 PM
Click Program Name for Module Details

Program Results by District

| Results by: | COMPANY | REGION | DISTRICT | STORE |
|---|---|---|---|---|
| | Students Enrolled | Students Started | Students Completed | Average Score |
| ALTERATIONS Grooming/Etiquette Video | 42 | 0 | 0 | |
| CHATEAU PROTEGÉ Grooming/Etiquette Video | 87 | 0 | 0 | |
| CORPORATE Grooming/Etiquette Video | 17 | 5 | 5 | 88.6 |
| GENERAL STORES Grooming/Etiquette Video | 20 | 4 | 4 | 92.75 |
| PROTEGÉ CAFÉ Grooming/Etiquette Video | 172 | 1 | 0 | |
| PROTEGÉ COLLECTION Grooming/Etiquette Video | 188 | 26 | 26 | 91.23 |
| PROTEGÉ OUTLET Grooming/Etiquette Video | 74 | 17 | 17 | 95.06 |
| PROTEGÉ UNLIMITED Grooming/Etiquette Video | 277 | 29 | 29 | 89.21 |

( home )    ( log out )

FIG. 4

70 — Programs
PROTEGÉ, INC.

72 — Results as of Feb 11, 2004 - 12:07:36 PM
Click Program Name for Module Details - Store Name for Employee Details Results by: COMPANY  REGION  DISTRICT  STORE  52"

76a — 76b — 76c — 76d

| Program Results by Store | Students Enrolled | Students Started | Students Completed | Average Score |
|---|---|---|---|---|
| 74'' 80 — CHATEAU PROTEGÉ DETROIT  Grooming/Etiquette Video | 70 | 0 | 0 | |
| 8a — CHATEAU PROTEGÉ NYC  Grooming/Etiquette Video | 17 | 0 | 0 | |
| 74'' 8b — CHATEAU PROTEGÉ OMAHA  Grooming/Etiquette Video | 34 | 0 | 0 | |
| CHATEAU PROTEGÉ PARAMUS  Grooming/Etiquette Video | 9 | 0 | 0 | |
| CHATEAU PROTEGÉ TRENTON  Grooming/Etiquette Video | 11 | 4 | 4 | 92.75 |
| PROTEGÉ CAFÉ BOSTON  Grooming/Etiquette Video | 8 | 5 | 5 | 88.6 |
| PROTEGÉ CAFÉ L.A.  Grooming/Etiquette Video | 9 | 0 | 0 | |
| PROTEGÉ CAFÉ MIAMI  Grooming/Etiquette Video | 42 | 0 | 0 | |
| PROTEGÉ CAFÉ SAN DIEGO  Grooming/Etiquette Video | 19 | 0 | 0 | |
| PROTEGÉ CAFÉ SHORT HILLS  Grooming/Etiquette Video | 18 | 3 | 3 | 95.33 |

Employees ~ 7º
PROTEGÉ, INC. ~ 7º          72                              52 ¹¹¹

Employee Results as of Feb 11, 2004 - 12:15:22 PM

|  | Results by: | COMPANY | REGION | DISTRICT | STORE |
|---|---|---|---|---|---|
|  |  | Started | | Completed | Score |

Employee Results for Store
PROTEGÉ CAFÉ L.A.

Clarke, A.  ⎯⎯ 82
MENS SALES PERSON
  Harassment Seminar
  Harassment Quiz             NOT STARTED        NOT COMPLETED Haldeman, J.
MENS MANAGER                                                                                                                                                 80
  Harassment Seminar
  Harassment Quiz        01/23/03 5:25PM      01/23/03 5:29PM     80

Heinlein, R.
WOMENS SALES PERSON
  Harassment Seminar                                                                                70
  Harassment Quiz        11/04/02 5:11PM      11/04/02 5:22PM     70

Niven, L.
SHIPPING RECEIVING
ASSOCIA
  Harassment Seminar
  Harassment Quiz             NOT STARTED        NOT COMPLETED Silverberg, R.
HEAD CASHIER
  Harassment Seminar
  Harassment Quiz        11/04/02 4:05PM      NOT COMPLETED

Results
PROTEGÉ, INC.
Adptng to Change Seminar - ATC Quiz

Results as of Feb 11, 2004 - 12:19:55 PM

ATC Quiz
Results Companywide

| | Results by: COMPANY | | REGION | DISTRICT | STORE | |
|---|---|---|---|---|---|---|
| | % of Students | # of Students | Total # of Students | Average Time in Seconds | | Answer Value |

Question 1
All change is negative

| | | | | | | |
|---|---|---|---|---|---|---|
| A - True | 4% | 1 | 32 | | 18 | Incorrect |
| B - False | 96% | 31 | 32 | | 15 | Correct |

Question 2
Change usually involves which of the following

| | | | | | | |
|---|---|---|---|---|---|---|
| A - The people you work with | 4% | 1 | 32 | | 16 | Incorrect |
| B - Tasks and responsibilities | 0% | 0 | 32 | | 0 | Incorrect |
| C - Your work environment | 0% | 0 | 32 | | 0 | Incorrect |
| D - All of the above | 96% | 31 | 32 | | 23 | Correct |

Question 3
Once you understand the forces at work that cause a change, you must accept the change

| | | | | | | |
|---|---|---|---|---|---|---|
| A - True | 54% | 17 | 32 | | 22 | Incorrect |
| B - False | 46% | 15 | 32 | | 27 | Correct |

HOSTED LEARNING MANAGEMENT SYSTEM AND METHOD FOR TRAINING EMPLOYEES AND TRACKING RESULTS OF SAME

BACKGROUND OF THE INVENTION

1. Field of the Invention

The invention relates to training programs and more specifically to methods and systems for tracking the results of retail, service, or other employee training programs.

2. Description of Related Art

Training employees on various aspects of a company's policy and procedures is an important human resource issue for large retail, service, and similar corporations. A system must be in place to insure that employees in different stores or outlets receive the same or similar training so that the corporate identity of the company is preserved and so that the company can be certain that each store is meeting at least the minimum levels of acceptable training.

Previous methods of conveying such information to employees include the use of a manual and the use of speakers to large groups of employees. The former is largely ineffective for several reasons. Typically, a corporate manual is many pages long, and the employee has little interest in reading it. Further, the company has little assurance that the employee will actually read the manual. While an employee may be asked to sign a statement indicating that he or she read the manual, such a mechanism provides little assurance of an actual reading of the manual by the employee.

The latter method, providing a speaker to an assembly of employees, also has several drawbacks. While it is simple enough to take attendance at such an event, there is no guarantee that an employee will actually retain anything taught at the assembly. Further, for extremely large companies, either the company must rent out an enormous assembly area for the assembly or the speaker or speakers must perform the same program multiple times for different audiences. Neither of these methods is very efficient.

Recently, companies have been training their employees via videotaped presentations or presentations made on CD-ROM or other media. This is a significant improvement to the above-described methods for several reasons. First, the employees can be trained in small groups or even individually at the stores themselves or in an office or conference room as opposed to a large assembly space or convention center. Because the training program is fixed in a reusable medium, the program itself need only be recorded once, and a number of copies of the training program may be distributed to each store or outlet. Further, each location can use its copy of the training program periodically, e.g., annually, or every time a new employee is hired, or the like. Finally, since each employee can be shown the training program at the convenience of the company, a contemporaneous quiz or test may be administered to the employee either during the training program or immediately or shortly thereafter. By later grading the employee's quiz or test, the company can determine how effective the training program was by seeing precisely how much material the employee absorbed. Such a method is described in U.S. Pat. No. 6,514,079 to McMenimen et al., the teachings of which are incorporated by reference herein.

Despite the advantages offered by recorded training programs, drawbacks remain in conventional systems. Primarily, the tracking of employee test data can be laborious and difficult, particularly if a company has many hundreds or thousands of employees. It would be desirable though difficult to be able to sort test data by any number of different variables, such as by employee, by store, by training program (assuming more than one program is provided), and the like. To do so using conventional systems, test data would have to be entered into a central database in a sortable manner, quite a labor-intensive task for large companies. Also, if the tests are administered either in groups or serially to individual employees, at least some employees are likely to cheat, either by directly asking a colleague what an answer was, or by watching him take the test. Store managers can also aid and abet in cheating by giving their employees the answers to raise the overall score of their respective stores.

Certain conventional employee training systems place their training programs on a central computer that is accessible remotely. This insures that every employee is accessing the same program, however it requires a robust connection between each local computer and the server to handle the amount of data being transmitted (namely, the entire training program). If a program is mere text, this is not as much of a problem, however the overwhelming majority of training programs incorporate full-motion video, which would require significant bandwidth over the communications link. For large companies, the server would also necessarily be very robust so as to handle numerous connections simultaneously.

SUMMARY OF THE INVENTION

The invention solves the above and other problems and is a hosted learning management training system for training employees. The system includes at least one local computer, in one of a store, an office, a restaurant, a ticket desk, or any other primary customer interface unit of the company. A training program is resident on the local computer, the training program including an interactive test having questions. A first human-computer interface is connected to the local computer enabling an employee to enter answers to the questions in the local computer. A remote computer server at a central location is selectively communicatable with the at least one local computer. When an employee interacts with the training program, the local computer transmits only the employee's identifier and test information to the central server.

Test information includes at least one of the following: employee identifier, test start time, test completion time, test duration, time spent on each question, the answers entered by said employee, and test version identification. By only transmitting test information, the instant invention makes it possible for unsophisticated local computers to communicate quickly and efficiently with the central server, even over low-speed connections such as dial-up service.

The training program resides on at least one of the following media: a CD-ROM playable on the local computer; a DVD playable on the local computer; a videotape playable in close proximity to the local computer; and at least one software file on the local computer. The training program preferably includes audio and/or video components. By separating the training program from the answers submitted by the employee, only the answer data and other test information need be transmitted to the server for processing. This eliminates the need for large bandwidth communications capabilities from the local computer, since the otherwise large training program remains locally resident and need not be transmitted at all.

Preferably, the system includes software resident on the central server for sorting the test information. The sorting software can sort the test information by at least one of the following categories: by store, by employee, by question, by training program, by employee type, by score, by test start time, by test end time, by test duration, by question, by answer, by employee response time to a question, by region, by district, and company-wide. When the employee's answers are tallied by the sorting software, results from the tallying are transmitted from the server to the local computer and are accessible to the employee.

The system preferably includes a second interface that enables a manager to access the test information on the central server. This second interface preferably includes an Internet connection allowing remote access to the central server and more preferably includes a dynamically created website. When a manager accesses the website, the test information is visually updated and presented to the manager. The first interface includes conventional interfaces such as a keyboard, a mouse, a touch-screen, voice recognition software, and an interactive voice response (IVR) system.

Preferably, the local computer is owned by a first retail, service, or other similar company and the remote server is owned by a second information company servicing the first company. For companies having more than one office or store, multiple local computers are provided each in selective communication with the server. The first company preferably pays a subscription fee to the second information company, e.g., on a per employee basis, on a flat periodic basis, or the like, or combinations thereof.

The invention also includes a method of training employees via a hosted learning management training system, each employee preferably having a unique identifier. In the inventive method, an interactive test having questions is shown on or near at least one local computer in one of a store and an office. An employee is able to take the test and enter answers to the questions on the local computer via a first human-computer interface connected to the local computer. A remote computer server is provided at a central location in communication with the at least one local computer. Only the employee identifier and test information is transmitted from the local computer to the central server when an employee interacts with the training program. Answers tallied on the server are preferably transmitted back to the local computer for access by the employee. The employee will preferably see both his answers and the correct answers in juxtaposition, and/or possibly his running score or final score on the test. The server also monitors and/or transmits the progress of the employee at the end of each training module and/or at each initial login by the employee to the system. Different employees may be authorized to participate in different training sessions or modules relevant to their level or the nature of their employment.

In the inventive method, the local computer is preferably owned by a first retail, service, or other similar company and the remote server is preferably owned by a second information company servicing the first company. The first company preferably pays the information company a subscription fee for each of its employees participating in the training program.

A manager may access the test information remotely, preferably via a second human-computer interface in communication with the server, more preferably via a dynamically created web page that updates the test information whenever the manager accesses the test information.

Also in accordance with the inventive method, test information is sorted by at least one of the following categories: by store, by employee, by question, by training program, by employee type, by score, by test start time, by test end time, by test duration, by question, by answer, by time spent on each question, by region, by district, or by the entire company.

DETAILED DESCRIPTION OF THE PREFERRED EMBODIMENTS AND DRAWINGS

Description of the invention will now be given with reference to FIGS. 1-6 appended hereto. It should be noted that these drawings are merely exemplary in nature and in no way serve to limit the scope of the invention, which is defined by the claims appearing hereinbelow.

Figure 1:
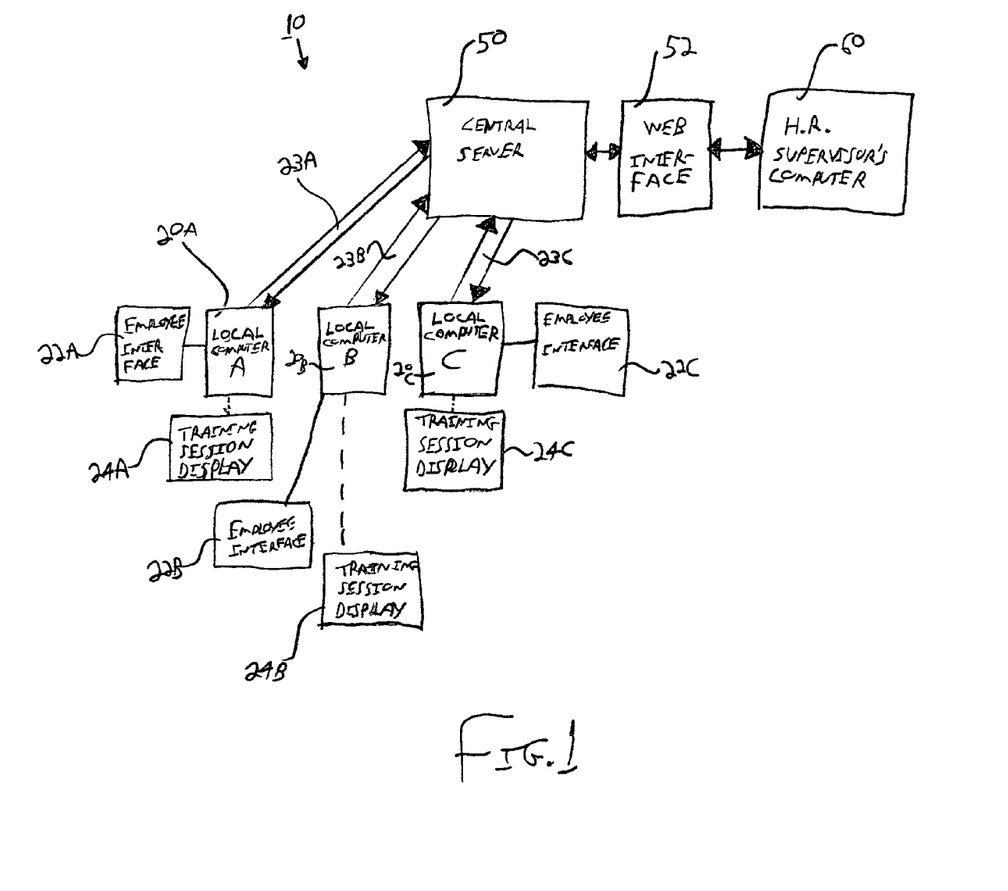
FIG. 1 is a schematic block diagram illustrating a general embodiment of the invention.

An overview schematic of the inventive training system 10 is shown in FIG. 1. The main components of system 10 are local computers 20 and central server 50. In FIG. 1, three local computers 20A-C are depicted, however any number may be employed in the system. For a large company with many stores, outlets, restaurants, ticket desks, or offices (hereinafter "stores"), and many employees, each store would have its own local computer 20. Each local computer 20 would have either resident thereon or nearby a training program or a series of programs. The programs may be resident on the memory of local computer 20 in the form of software (e.g., a Macromedia Director file), or the programs may be insertable into a local computer 20 and resident on a medium such as a CD-ROM or DVD and thus playable by local computer 20. Alternatively, the training programs may be on any other medium, for example, a videocassette playable on a nearby (e.g., in the same room as the computer) VCR or a disc playable on a videodisc player. In this alternative embodiment, the training program is nearby the computer; all cases are thus resident "with" the computer (either in, playable by, or playable nearby the computer).

Connected to or associated with each local computer 20 are an interface 22 and a display or presentation device 24 (hereinafter "display"). As shown in FIG. 1, each of local computer 20A-C has respectively an interface 22A-C and display 24A-C. Display 24 is connected to local computer 20 via a dotted line, because not all displays covered by the invention are directly connected to the computer. As described above, if the medium on which the training program is presented is not compatible with local computer 20 (as in the videocassette example), or if it is simply desired to run the training program on a separate piece of equipment (not shown), display 24 would be connected to the separate piece of equipment and not local computer 20. In such case, display 24 would still be deemed to be "associated with" local computer 20. "Display" in this application also includes non-visual means of communication, e.g., for the visually impaired, and thus includes any form of audio equipment capable of presenting information.

Interface 22 is preferably connected to local computer 20, as it is the mechanism by which an employee enters data into local computer 20. Specifically, interface 22 allows an employee, upon watching a training program and coming to a question or quiz portion of the program, to enter an answer or answers into local computer 20. In the case of the CD-ROM, DVD, or resident software, the training program may be interactive and show a different clip dependent upon which answer was selected. Interface 22 also allows the employee to enter identification information as needed, such as employee ID number, location, store, etc. Alternately, an employee could write his answers down on a piece of paper, however someone would eventually have to enter those answers into local computer 20 via interface 22. Interface 22 is contemplated to include any and all human-computer interfaces in existence now or to be developed, such as (but not limited to) a keyboard, a mouse, a touch-screen (either integral with display 24 or separate therefrom), voice recognition software, or an IVR system. These could be connected via wire or wirelessly in a conventional manner. In the case of an IVR system, the entire training program could be conducted over the telephone as a teleconference. In this case, the "display" 24 would be the ear piece of the telephone and the training program would be a predominantly audio program. The interface 22 would be either the mouthpiece into which a telephone user speaks or else the keypad of the telephone; in the former case, voice recognition software may be employed to recognize the employee's answers, and in the latter case, the various tones of the buttons would be recognizable by the system instead. Such an IVR-based system might eliminate the need for a local computer 20.

As another alternative, display 24 and interface 22 could be combined into a single device. One example of such a combined device could be a hand-held personal data assistant (PDA) or a hand-held computer such as a Palm PC® manufactured by the Palm Corporation. Data could be entered by the employee in any of the manners available to users of such devices, and the data could be transferred to local computer 20 by docking the hand-held device with local computer 20, by wirelessly beaming the information to local computer 20, or any other means of transferring information from hand-held devices.

Each local computer 20 can communicate with central sever 50 via communications link 23; as above, each computer 20A-C preferably has its own link 23A-C. Two or more local computers might be networked together and thus require only one common link (not shown). Each link 23 is shown having two arrows, one pointing towards central server 50, and one pointing towards its respective local computer 20. Each link 23 is preferably bi-directional so that information can be exchanged between a local computer 20 and central server 50. Owing to the specific nature of the exchanged information, as will be discussed below, link 23 need only be the barest of communication lines, e.g., a dial-up modem of 56 kbps. Link 23 can be any type of communication link, but it is preferred that it is a conventional Internet connection via a modem, DSL service, a proxy server, or the like.

At the employee end of the inventive system, an employee is instructed to take a training program by his supervisor. When the employee logs into the system, he preferably inputs his employee identifier, unique to him, which could be his name or an ID number or something similar. The input employee identifier may be transmitted by local computer 20 to server 50, and in response, server 50 may respond to local computer 20 by telling the employee which training module he is supposed to complete at that time. The sequence of which training module is completed in what order may be important to the training of the employee. As such, the system may lock an employee into viewing a given training module until he passes it. Similarly, upper level training modules may not be made available to lower level employees based on the employees' identifiers, or modules concerning tasks or areas wholly irrelevant to a given subset of employees will likewise not be made available.

In any event, the employee views the training program on display 24. At some point during the training program, either during or after, the employee is presented with one or more questions in the form of a quiz or test. Alternatively or in addition, the training program includes a simulated scenario to which the employee must respond. The employee responds to the question(s) by inputting his answer(s) (which may be multiple choice or open response) on interface 22, which is connected to local computer 20. When the employee has entered an answer or other test information, local computer 20 uploads that information to central server 50 via link 23. The local computer may also upload test version information which lets the server know which version of the training program is being run at the local computer; such information falls under the category of "test information" as understood in this context. The local computer can upload the information after each question, or after a test is completed, or when an employee first logs onto the system, or at other convenient times.

Only test information and employee identification information is transmitted by local computer 20. Since this data is very small and simple, even a slow dial-up connection could transmit the data very quickly. For example, if the ID and test information total a few kilobytes of data, a standard 56 kbps modem can transmit such data in one second or less (excluding time spent on handshaking the connection, e.g.).

As central server 50 receives test information from local computer 20, software resident on central server 50 (or on another machine in communication with server 50) sorts the test information into relevant categories, e.g., employee ID number, name, answers to questions, test start time, test completion time, etc. A manager, human resources worker, or other supervisory individual can access the data from her computer 60 via the Internet. Specifically, when the supervisor logs onto the server, a web page is dynamically created as web interface 52 pursuant to the data sorting requests of the supervisor. Since the data from local computers 20 is stored in tables on server 50, server 50 and its sorting software can easily create charts and tables viewable by the supervisor on demand. Alternatively, depending upon load requirements for some larger companies (e.g., over 300 stores), the software on server 50 may need to tally some of the larger averages by itself on regular intervals so that such data is readily retrievable on demand.

When an employee has finished a training program or a section or module thereof, and all (or a predetermined number) of his answers have been received by central server 50, server 50 determines whether the answers are correct and transmits answer information back to local computer 20. Such answer information can include the employee's own answers, the correct answers, the employee's running score, the employee's final score, and/or the employee's overall progress vis-a-vis which modules he has completed. Again, because such answer data is very small and simple, transmission can be effected on the most basic of communication links (although the central server will likely but not necessarily have a faster communication link than any given local computer).

FIGS. 2-6 depict sample web pages created as part of web interface 52. After an initial login page where the user (e.g., HR personnel) enters her ID and password, the user's browser is directed to an initial home page as exemplified as web page 52 in FIG. 2. ID field 70 indicates the user's company's identity, and timestamp field 72 indicates from when the results are current. Because the page is dynamically created, timestamp field 72 usually reflects the moment at which the page was created, i.e., when the user accessed this page. If the user were to print the page for archival purposes, the user would readily know when the data appearing on the page was created (if she were to go back to the website at a later date, the data might change, since the data is constantly updated from uploads from local computers 20).

Figure 2:
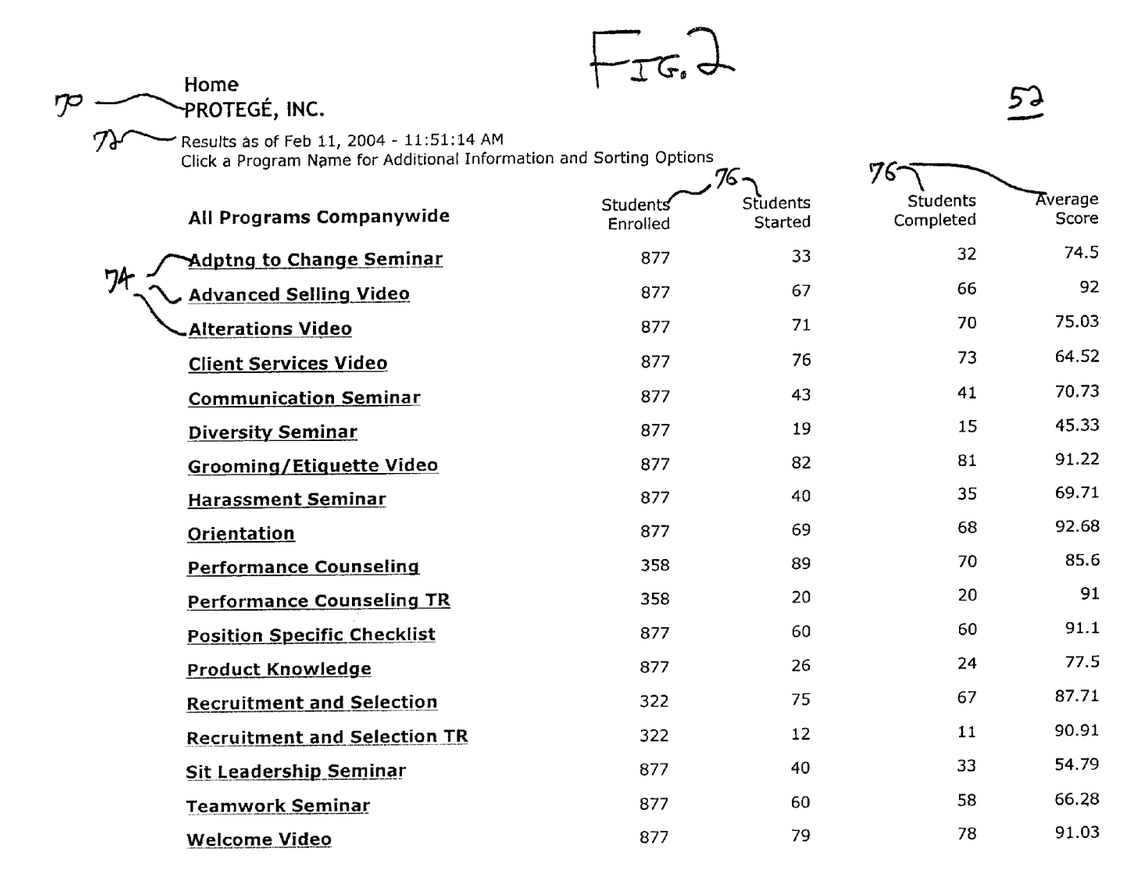
FIG. 2 is a representative screen shot of a dynamic web page created in accordance with the invention.

In the sample web page 52 of FIG. 2, the fictitious retail company Protege, Inc. has a number of training programs 74 available for its employees. Data fields 76 on home page 52 typically represent broad and general data, such as the number of employees or students who are enrolled or started a program or completed a program, and their average score per program. Such data gives the supervisor-user a quick overview of the efficacy of each program. For example, as shown in FIG. 2, the Grooming/Etiquette Video program has an average score of 91.22, whereas the Diversity Seminar has an average score of only 45.33. Immediately, the supervisor knows where her company's employees' strengths and weaknesses lie in general.

Figure 3:
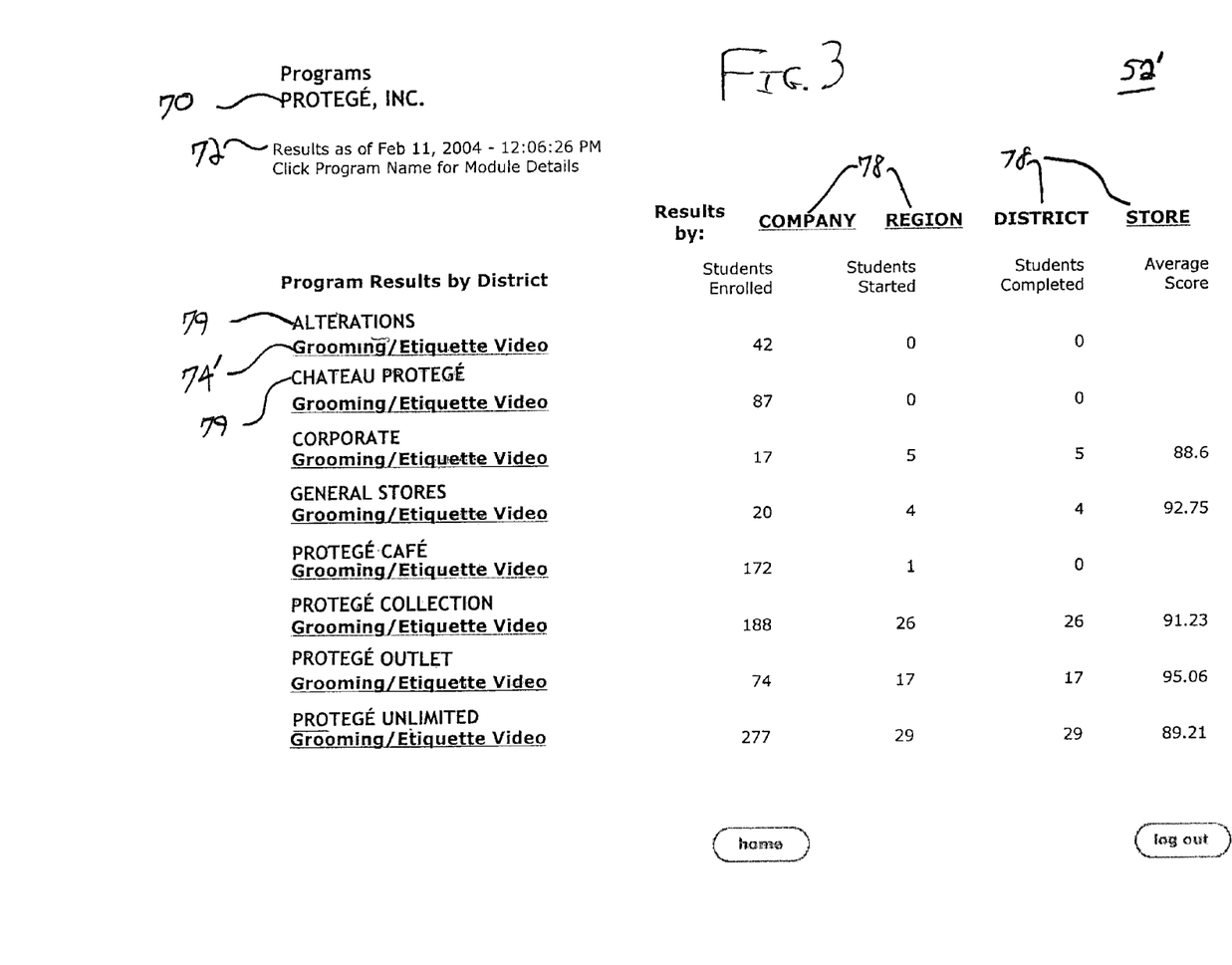
FIG. 3 is a second representative screen shot of a dynamic web page created in accordance with the invention.

Upon clicking on one of the hyperlinks of training programs 74, interface 52 dynamically creates web page 52' as shown in FIG. 3. Web page 52' also includes ID field 70 and time stamp field 72. However, the data for the selected program 74 is now broken down by one or more groupings 78, e.g., company-wide, by region, by district, or by store. On sample web page 52', the "district" grouping has been selected. In this instance, the districts 79 that are listed are more akin to company divisions rather than geographical regions, however any form of sub-classification is contemplated.

Figure 4:
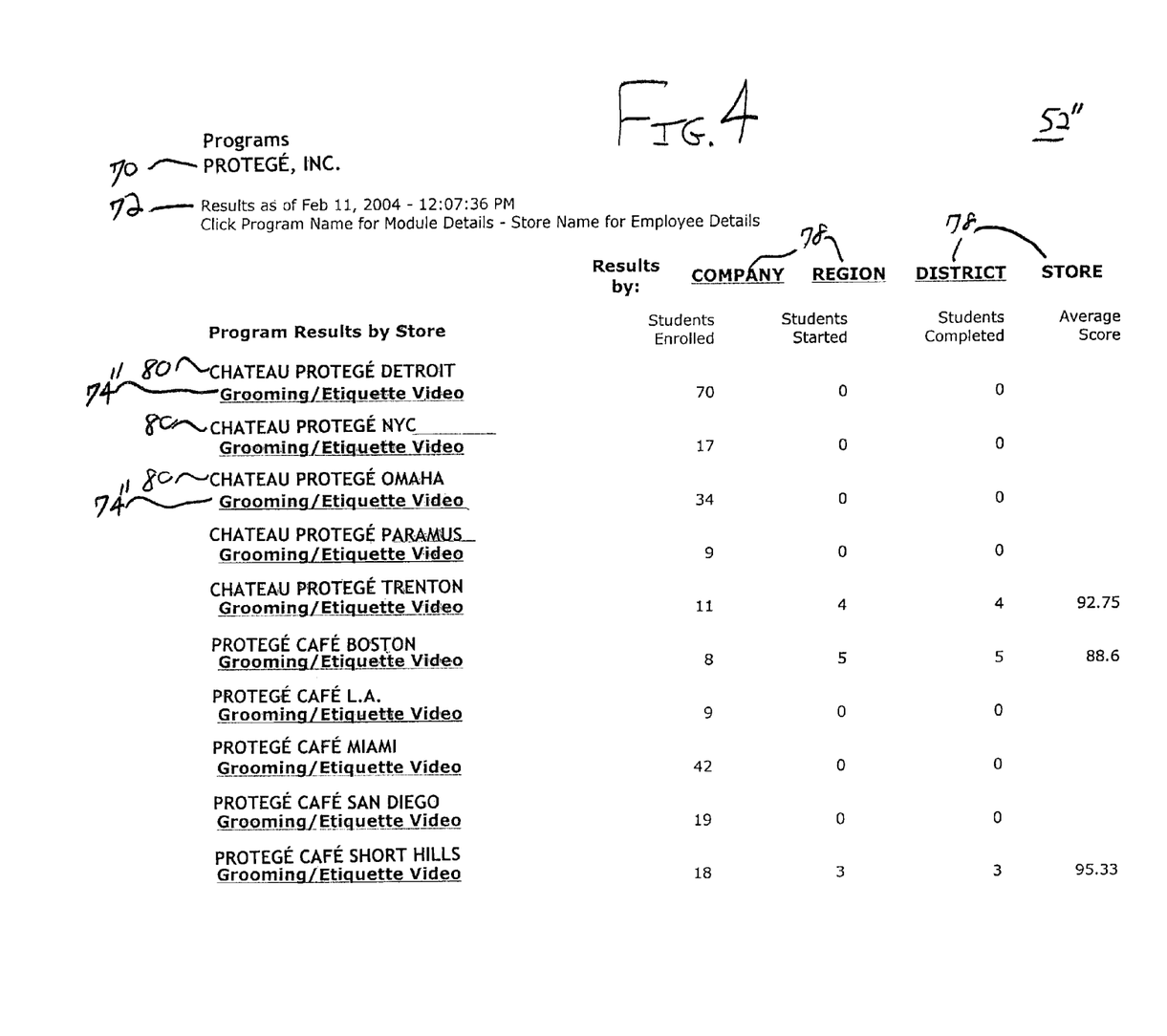
FIG. 4 is a third representative screen shot of a dynamic web page created in accordance with the invention.

Upon clicking the store link 78 (the groupings in the figures are preferably also hyperlinks), for example, web page 52" is dynamically created as shown in FIG. 4. Here, the same groupings 78 are available, but this time data is sorted by store company-wide. Results for each individual store are obtainable by clicking on the hyperlinks 74" of FIG. 4.

Figure 5:
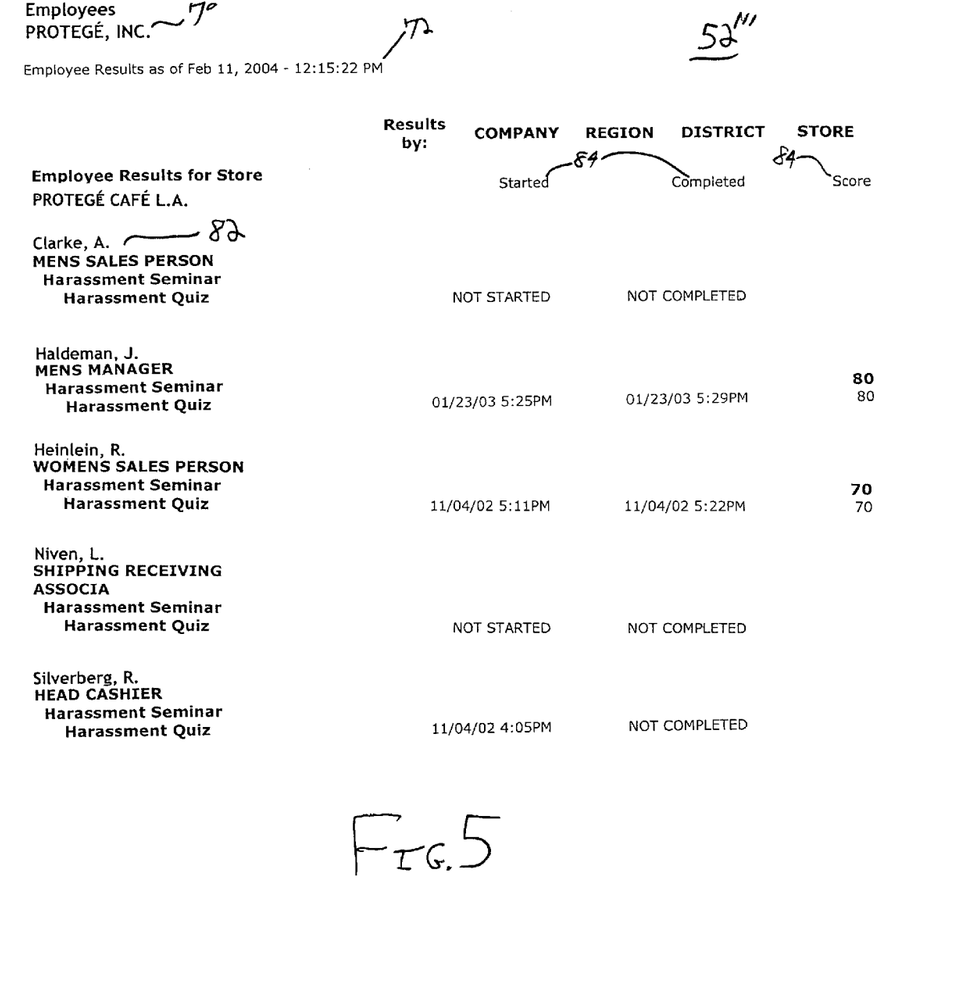
FIG. 5 is a fourth representative screen shot of a dynamic web page created in accordance with the invention.

FIG. 5 illustrates another dynamically created web page 52''', this time listing individual employees from a single store. Now, data fields 84 indicate which employee 82 has taken the training program, how long it took them to complete it, and how well they performed on the quiz.

Figure 6:
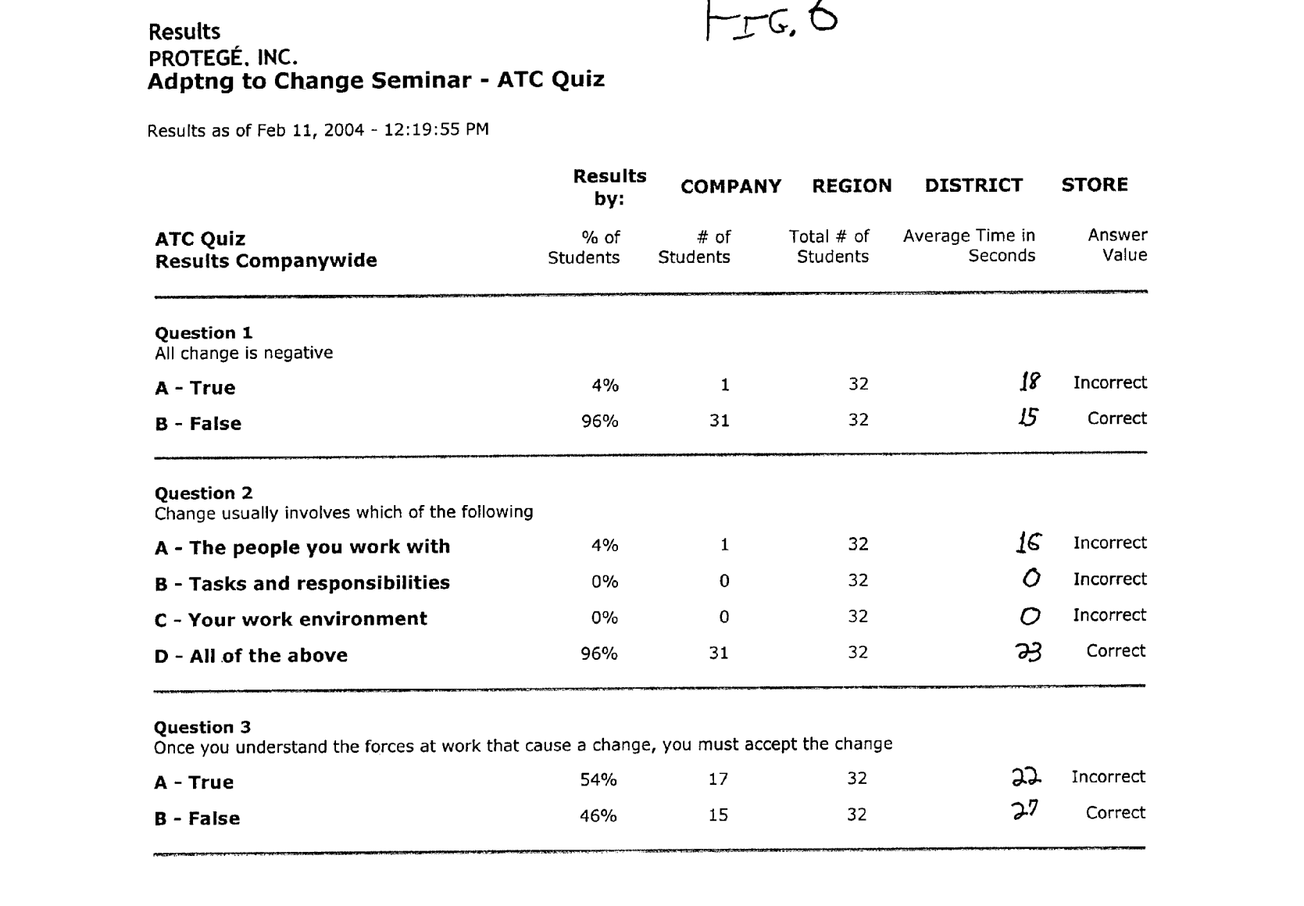
FIG. 6 is a fifth representative screen shot of a dynamic web page created in accordance with the invention.

Data is also viewable on a question-by-question basis, as exemplified in FIG. 6 as web page 52"". Here, the data is sorted by different fields 86, including percentage of students answering a given question with a given answer, the corresponding number of students, the total number of students, the average time it took the students to answer each question, and whether a given answer was correct or incorrect. Data 92 is given for each question 88 and answer 90. FIG. 6 shows data 92 for the entire company of Protege Inc., however such data can be sorted instead by region, district, or store as before.

The value of recording how long it takes for an employee to answer a question may not be readily apparent, however it is instructive in determining whether an employee is cheating on a quiz. For example, if the company average time for answering a given question is 12 seconds, and an employee answers it in 2 seconds or less, a red flag may be raised. If an employee answers all questions far below average or in no time at all, it can be presumed that he has the answers in advance and is merely inputting them when cued to do so. This method of determining the honesty of an employee is typically more effective if the company's employees do not know their response times are being recorded. Otherwise, a cheating employee could intentionally delay entering the answers he improperly obtained from another to give the appearance that he is mulling over his answers before submitting them.

As mentioned above, in the inventive system and method, the company preferably does not manage or maintain central server 50. The primary goal of a company is to sell its products or services, not to involve itself with training program minutiae. To this end, the invention contemplates that an information company owns and/or maintains central server 50, while the retail/service company might own and maintain its local computers 20. (Alternatively, the retail/service company might own or maintain the central server, and conversely, the information company might own or maintain the local computers.) With such a model, the retail/service company need only have very basic level computers and need not wire its stores with high speed connections for same. The retail/service company pays the information company a fee, preferably a subscription-type fee, for the setup and maintenance of the system and for continual access to the server by the employees entering answers and their supervisors reviewing the answers.

Further, the information company has multiple clients each of which connect to a common server or servers 50. Thus, referring again to FIG. 1, local computer 20A may belong to a first company, local computer 20B may belong to a second company, and local computer 20C may belong to a third company. Because each company's supervisor(s) is given a unique login ID and password, each company's respective test information is secure and not available to the other companies.

The invention is not limited to the above description. For example, the description and figures make reference to a retail company such as a large retail clothing entity. However, it is contemplated that the invention is equally applicable to other similar businesses, such as airlines, restaurant chains, hotels, etc. The invention is well-suited to training the employees of large companies with multiple geographic locations (e.g., stores, terminals, booths, restaurants, etc.) in order to impart the same or similar training globally to all employees while tracking the results of such training programs.

Having described the invention with reference to the drawings, it should be understood that the scope of the invention is not limited by the drawings but rather is defined by the claims appearing hereinbelow. Variations and modifications to the above description that would be obvious to one skilled in the art are contemplated as within the scope of the invention.

What is claimed is:

1. A hosted learning management training system for training employees, each employee having a unique identifier, comprising:
   at least one local computer having a low bandwidth connection;
   a high bandwidth training program resident with said local computer, said training program including an interactive test having questions;
   a first human-computer interface connected to said local computer enabling an employee to enter answers to said questions in said local computer;
   a remote computer server at a central location communicatable with said at least one local computer via said low bandwidth connection and receiving low bandwidth test information from said at least one local computer via said low bandwidth connection; and
   a second interface enabling a manager to access said low bandwidth test information on said central server,
   wherein when an employee interacts with said training program, said local computer transmits only the employee's identifier and said low bandwidth test information to said central server thereby allowing dynamic managerial oversight.

2. A hosted learning management training system for training employees according to claim 1, further comprising software resident on said central server for sorting said low bandwidth test information.

3. A hosted learning management training system for training employees according to claim 2, wherein when said employee's answers are tallied by said sorting software, results from said tallying are transmitted from said server to said local computer and are accessible to the employee, said results including at least one of the correct answers, the employee's running score, and the employee's final score.

4. A hosted learning management training system for training employees according to claim 1, wherein said second interface includes an Internet connection allowing remote access to said central server.

5. A hosted learning management training system for training employees according to claim 4, said second human-computer interface comprising a dynamically created website, wherein when a manager accesses said website, said low bandwidth test information is visually updated and presented to the manager.

6. A hosted learning management training system for training employees according to claim 5, further comprising sorting software for sorting said low bandwidth test information by at least one of the following categories: by store, by employee, by question, by training program, by employee type, by score, by test start time, by test end time, by test duration, by question, by answer, by employee question response time, by district, by region, and company-wide.

7. A hosted learning management training system for training employees according to claim 1, wherein said first interface includes at least one of a keyboard, a mouse, a touch-screen, voice recognition software, a hand-held device, a wireless hand-held device, and an interactive voice response system using a telephone.

8. A hosted learning management training system for training employees according to claim 1, said local computer being owned by a first company and said remote server being owned by a second information company servicing the first company.

9. A hosted learning management training system for training employees according to claim 1, wherein multiple of said at least one local computer are each provided in selective communication with said server via respective said low bandwidth connections.

10. A hosted learning management training system for training employees according to claim 1, wherein said high bandwidth training program resides locally on at least one of the following media: a CD-ROM playable on said local computer; a DVD playable on said local computer; a videotape playable in close proximity to said local computer; an audio cassette playable in close proximity to said local computer; and at least one software file on said local computer.

11. A hosted learning management training system for training employees according to claim 1, wherein said low bandwidth test information includes at least one of the following: employee identifier, test version identification, test start time, test completion time, test duration, time spent on each question, and the answers entered by said employee.

12. A method of training employees via a hosted learning management training system, each employee having a unique identifier, comprising the steps of:
   a) presenting a high bandwidth training program including a test having questions on at least one device associated with a local computer having a low bandwidth connection;
   b) enabling an employee to take the test and enter answers to the questions on the local computer via a first human-computer interface connected to the local computer;
   c) providing a remote computer server at a central location in communication with the at least one local computer via the low bandwidth connection and adapted to receive low bandwidth test information from the at least one local computer;
   d) transmitting from the local computer to the central server only the employee identifier and the low bandwidth test information via the low bandwidth connection when an employee interacts with the training program; and
   e) enabling a manager to access the low bandwidth test information from the central server in real time.

13. A method of training employees via a hosted learning management training system according to claim 12, further comprising the step of enabling a manager to access the low bandwidth test information remotely.

14. A method of training employees via a hosted learning management training system according to claim 13, wherein said manager-access-enabling steps further comprise the step of providing a second human-computer interface in communication with said server.

15. A method of training employees via a hosted earning management training system according to claim 14, further comprising the step of dynamically creating a web page with updated low bandwidth test information when the manager accesses the low bandwidth test information.

16. A method of training employees via a hosted learning management training system according to claim 15, further comprising the step of sorting the low bandwidth test information by at least one of the following categories: by store, by employee, by question, by training program, by employee type, by score, by test start time, by test end time, by test duration, by question, by answer, by district, by region, and company-wide.

17. A method of training employees via a hosted learning management training system according to claim 12, wherein the local computer is owned by a first company and the remote server is owned by a second information company servicing the first company.

18. A method of training employees via a hosted learning management training system according to claim 17, wherein the first company pays a subscription fee to the second information company for each of its employees participating in the training program.

19. A method of training employees via a hosted learning management training system according to claim 12, further comprising the step of providing multiple local computers each provided in selective communication with the server via respective low bandwidth connections.

20. A method of training employees via a hosted learning management training system according to claim 12, further comprising the step of transmitting from the server to the local computer for access by the employee at least one of: i) answers tallied on the server; ii) a test score; iii) test progress; and iv) test authorization.

21. A method of training employees via a hosted learning management training system according to claim 12, further comprising the step of detecting employee cheating on a training program test by recording the employees' response time to each question.

22. A method of training employees via a hosted learning management training system according to claim 21, said detecting step further comprising the step of comparing a given response time by one employee to a given question to other response times by other employees to the same question.

* * * * *